United States Patent

Strijker

[11] Patent Number: 5,901,052
[45] Date of Patent: May 4, 1999

[54] SWITCHED-MODE POWER SUPPLY HAVING A DELAY-INSENSITIVE TIMING IN THE CONTROL LOOP

[75] Inventor: Joan W. Strijker, Nijmegen, Netherlands

[73] Assignee: U.S. Philips Corporation, New York, N.Y.

[21] Appl. No.: 09/033,729

[22] Filed: Mar. 3, 1998

[30] Foreign Application Priority Data

Mar. 5, 1997 [EP] European Pat. Off. .............. 97200648

[51] Int. Cl.$^6$ ................................................ H02M 3/335
[52] U.S. Cl. ............................... 363/21; 363/97; 363/79; 323/285
[58] Field of Search .................... 363/15, 16, 20, 363/21, 97, 131, 79, 80, 75; 323/284, 285

[56] References Cited

U.S. PATENT DOCUMENTS

| | | | |
|---|---|---|---|
| 5,424,933 | 6/1995 | Illingworth | 363/21 |
| 5,757,625 | 5/1998 | Schoofs | 363/21 |
| 5,831,839 | 11/1998 | Pansier | 363/21 |

FOREIGN PATENT DOCUMENTS

0420997B1  4/1991  European Pat. Off. .

Primary Examiner—Edward H. Tso
Assistant Examiner—Y. J. Han
Attorney, Agent, or Firm—Steven R. Biren

[57] ABSTRACT

A flyback converter including a transformer (6) having a primary winding (4) and a switching transistor (2), arranged in series therewith; control device (14) for closing the switching transistor (2) during a primary interval and opening the switching transistor (2) during a secondary interval in response to a control signal ($U_c$), an auxiliary winding (12) for generating a feedback signal ($U_{FB}$), measurement device (20) for unidirectionally measuring the feedback signal ($U_{FB}$), a comparator (16) and a logic circuit (18) for deriving from the feedback signal ($U_{FB}$) a first timing signal ($TM_1$) which is representative of the secondary interval; comparison device for comparing the unidirectionally measured feedback signal ($I_{FB}$) with a reference signal ($I_R$) during the secondary interval, and an integrator (28) for generating the control signal ($U_C$) in response to the comparison. The switched-mode power supply further includes a logic circuit (32) for generating a second timing signal ($TM_2$) having a starting instant which falls within the primary interval having an end instant which at least does not precede the end instant of the secondary interval. A first time-selective element (26) transfers the reference signal ($I_R$) under command of the first timing signal ($TM_1$), and a second time-selective element (30) transfers the unidirectionally measured feedback signal ($I_{FB}$) under command of the second timing signal ($TM_2$). As a result of this, the output voltage of the flyback converter is not affected by errors which are caused by a delay in the generation of the first timing signal ($TM_1$).

7 Claims, 4 Drawing Sheets

# SWITCHED-MODE POWER SUPPLY HAVING A DELAY-INSENSITIVE TIMING IN THE CONTROL LOOP

BACKGROUND OF THE INVENTION

The invention relates to a switched-mode power supply comprising: an inductive element and a switching element arranged in series to receive a supply voltage; control means for closing the switching element during a primary interval and opening the switching element during a secondary interval in response to a control signal; measurement means for unidirectionally measuring a feedback signal which is representative of a signal voltage produced across the inductive element as a result of the switching element being opened and closed; means for deriving from the feedback signal a first timing signal which is representative of the secondary interval; time-selective comparison means for comparing the unidirectionally measured feedback signal with a reference signal during at least the secondary interval; and integration means for generating the control signal in response to the comparison.

Such a switched-mode power supply is known from, for example the European Patent EP 0 420 997. Said Patent discloses a self-oscillating flyback converter in which the inductive element is a primary winding of a transformer and the switching element is a transistor which is turned on and turned off. In the primary interval the transistor is turned on and magnetic energy is built up in the transformer. In the secondary interval, which follows the primary interval, the transistor is turned off and the built-up energy is supplied to a load, which is connected to a secondary winding of the transformer via a diode. The voltage variation across the secondary winding is measured by means of an auxiliary winding, which is magnetically coupled to the secondary winding. However, such an auxiliary winding is not necessary. The secondary winding itself or even the primary winding can also be used for this purpose. The signal reversals in the voltage across the auxiliary winding are used to generate the first timing signal, which indicates the beginning and the end of the secondary interval. The voltage across the auxiliary winding fluctuates about a zero value. During the secondary interval this voltage is, for example, negative. The magnitude of is negative voltage is a measure of the voltage across the load. For this purpose, the voltage across the auxiliary winding is measured unidirectionally, i.e. only the negative component is allowed to pass and is compared with a reference signal in a time window which is defined by the first timing signal. Thus, the comparison is effect only during the secondary interval defined by the first timing signal. The result of the comparison is integrated and the resulting control signal changes the on-off time of the switching transistor until eventually the average value of the integrated signal is zero.

For deriving the first timing signal from the feedback signal across the auxiliary winding electronic circuits are needed, which are a source of delays. A consequence is that the edges of the first timing signal lag the sign reversals in the feedback signal. As will be explained more fully hereinafter, is results in an error signal being produced at the end of the secondary interval in the time-selectively measured difference between the reference signal and the unidirectionally measure feedback signal. This error signal is also integrated, as a result of which the voltage across the load is controlled to another value than expected. The output voltage is therefore dependent upon the delay.

SUMMARY OF THE INVENTION

It is an object of the invention to provide a solution for the delay-dependence of the output voltage. To this end, the switched-mode power supply of the type defined in the opening paragraph is characterized in that the switched-mode power supply further comprises means for generating a second timing signal having a starting instant which falls within the primary interval and having an end instant which at least does not precede the end instant of the secondary interval; and the time-selective comparison means comprise: a first time-selective element for transferring the reference signal in response to the first timing signal, and a second time-selective element for transferring the unidirectionally measured feedback signal in response to the second timing signal.

Now the reference signal and the unidirectionally measured feedback signal are no longer transferred, compared and integrated time-selectively by means of the same timing signal, i.e. the first timing signal, but by means of different timing signals. The reference signal is transferred time-selectively by means of the first timing signal, whose leading edge and trailing edge are subject to delays. The unidirectionally measured feedback signal is transferred time-selectively by means of a second timing signal whose trailing edge substantially coincides with that of the first timing signal but whose leading edge occurs somewhere in the primary interval. As will be explained more fully hereinafter, this results in an otherwise missing portion of the unidirectionally measured feedback signal now being transferred time-selectively and the error signal being compensated during the integration of the difference signal. The leading edge of the second timing signal can be derived from the signal by means of which the switching element is turned on during the primary interval. This derivation may be accompanied with a delay but as long as this delay is smaller than the primary interval this has no influence.

BRIEF DESCRIPTION OF THE DRAWING

These and other aspects of the invention will be described in more detail with reference to the accompanying drawings, in which.

In these Figures parts having the same function or purpose bear like reference symbols.

DESCRIPTION OF THE PREFERRED EMBODIMENTS

Figure 1:
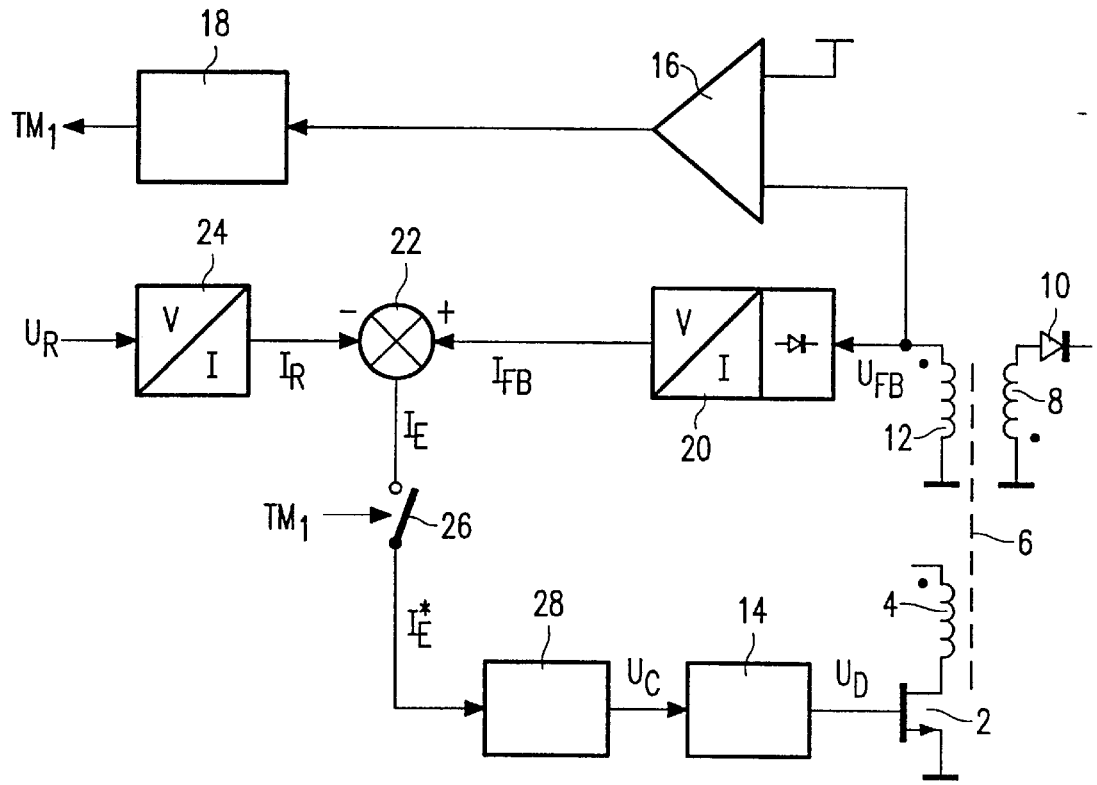
FIG. 1 shows a prior-art switched-mode power supply.

FIG. 1 shows a prior-art switched-mode power supply. A switching element, in the present case for example an N-type FET switching transistor 2, is arranged in series with a primary winding 4 of a transformer 6, which has a secondary winding 8 connected to a load, not shown, via a diode 10. The transformer 6 further comprises an auxiliary winding 12. The secondary winding 8 and the auxiliary winding 12 have one side connected to ground. The primary winding 4 has one side connected to a positive voltage. The other side of the primary winding 4 is connected to ground via the switching transistor 2. It will be evident that it is alternatively possible to use another type of transistor, for example a bipolar transistor, as the switching element. If desired, the switching transistor can be of an opposite conductivity type, in which case the supply voltage should be negative with respect to ground. The switching transistor is turned on and turned off by means of a control signal $U_D$ supplied by a driver 14. The voltage $U_{FB}$ across the auxiliary winding 12 is compared with ground potential in a comparator 16, which controls a logic unit 18, which in its turn generates a first timing signal $TM_1$. The negative portions of the voltage $U_{FB}$ are converted into a current $I_{FB}$ by means of a unidirectional voltage-current converter 20. The current $I_{FB}$ functions as a feedback signal, which is compared with a reference current $I_R$ in a difference stage 22, which reference current has been derived from a reference voltage $U_R$ by means of a voltage-current converter 24. The difference $I_E$ between the currents $I_R$ and $I_{Fb}$ is sampled by means of a time-selective element 26, represented as a switch which is closed under command of the first timing signal $TM_1$. The sampled difference signal $I^*_E$ is integrated in an integrator 28 to form a control signal $U_C$. The control signal $U_C$ controls the ratio between the time intervals during which the switching transistor 2 is turned on and turned off by the driver 24. The conversion of the voltages $U_{FB}$ and $U_R$ into currents has been given merely by way of example and may be dispensed with, if desired.

Figure 2:
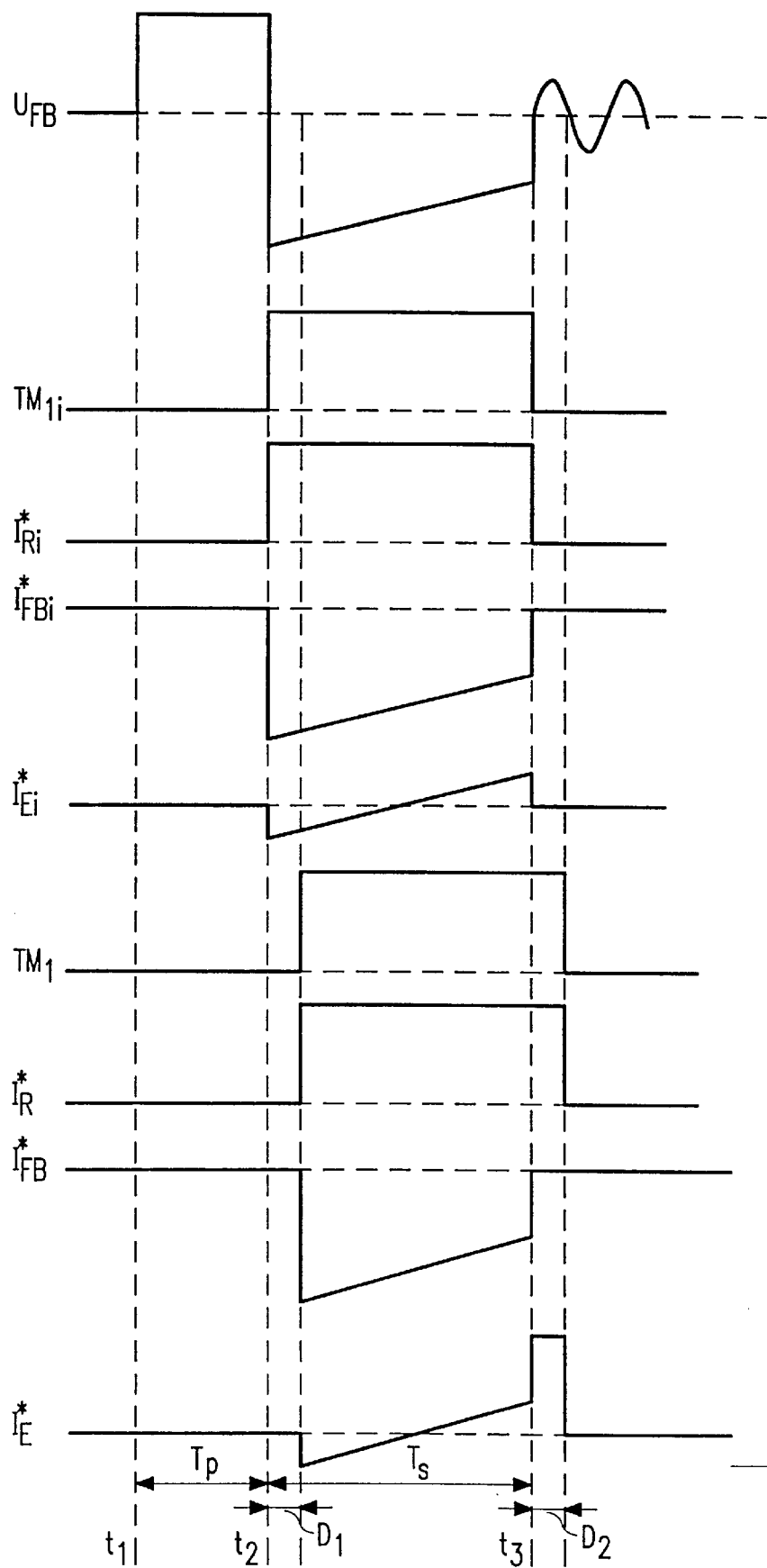
FIG. 2 shows signal waveforms appearing in the switched-mode power supply of FIG. 1.

The operation of this known switched-mode power supply is explained with reference to FIG. 2, which shows some signal waveforms appearing in the switched-mode power supply. The switching transistor is turned on at the instant $t_1$ and is turned off at the instant $t_2$. The interval between the instants $t_1$ and $t_2$ is the primary interval $T_P$, in which the supply voltage is applied across the primary winding 4 and energy is built up in the transformer 6. The diode 10 is then cut off and no current flows to the load. The voltage $U_{FB}$ across the auxiliary winding 12 is then positive with respect to ground. At the instant $t_2$ the switching transistor 2 is turned off and the stored energy is transferred to the secondary winding 8. The voltages across the windings of the transformers then change signs. Now the secondary interval $T_S$ begins, in which a current flows to the load through the diode 10. This current decreases and becomes zero at the instant $t_3$, which marks the end of the secondary interval $T_S$. The voltage $U_{FB}$ then jumps from a given negative value to zero in accordance with a sinusoidal line, shown as a straight line for the sake of simplicity. After the current through the diode 10 has become zero the voltage across the secondary winding 8 and, as a consequence, also the voltage across the auxiliary winding 12 oscillates until the switching transistor is turned on again.

The negative voltage transient at the instant $t_2$ and the positive voltage transient at the instant $t_3$ in the signal $U_{FB}$ are detected by means of the comparator 16 and converted into the first timing signal in the logic unit 18. In the ideal case said detection and conversion proceed without any delay. In FIG. 2 the signal waveforms corresponding to this ideal situation are shown as $TM_{1i}$, $I^*_{Ri}$, $I^*_{FBi}$ and $I^*_{Ei}$, which represent the first timing signal for the time-selective element 26, the sampled reference current, the sampled feedback current and the sampled error current, respectively. In the final situation the average value of the sampled reference current $I^*_{Ei}$ is zero and the output voltage across the load has a value which is in a fixed proportion to the reference voltage $U_R$.

However, in practice the generation of the edges of the first timing signal $TM_1$ is subject to delay in the comparator 16 and the logic unit 18 and the leading and trailing edges of the first timing signal are delayed by a time $D_1$ and $D_2$ respectively. In FIG. 2 the signal waveforms corresponding to the practical situation are shown as $TM_1$, $I^*_R$, $I^*_{FB}$ and $I^*_E$, which represent the delayed first timing signal for the time-selective element 26, the likewise delayed sampled reference current, the sampled feedback current and the sampled error current, respectively. The signal portion which occurs in the delay time $D_1$) after the instant $t_2$ is now absent in the sampled feedback current $I^*_{FB}$. At the instant $t_3$, i.e. already before the sampled reference current $I^*_R$ returns to zero, the sampled feedback current $I^*_{FB}$ becomes zero again. The sampled difference current $I^*_E$ now has an undesired positive component during the delay time $D_2$ after the instant $t_3$. This component is also integrated and, as a result of it, the output voltage in the final situation, in which the average value of the sampled difference current $I^*_E$ is zero, has a value which deviates from the expected value. The output voltage is consequently dependent on the delay times D1 and D2. This is annoying particularly in the case of short secondary intervals, i.e. in the case of small loads.

Figure 3:
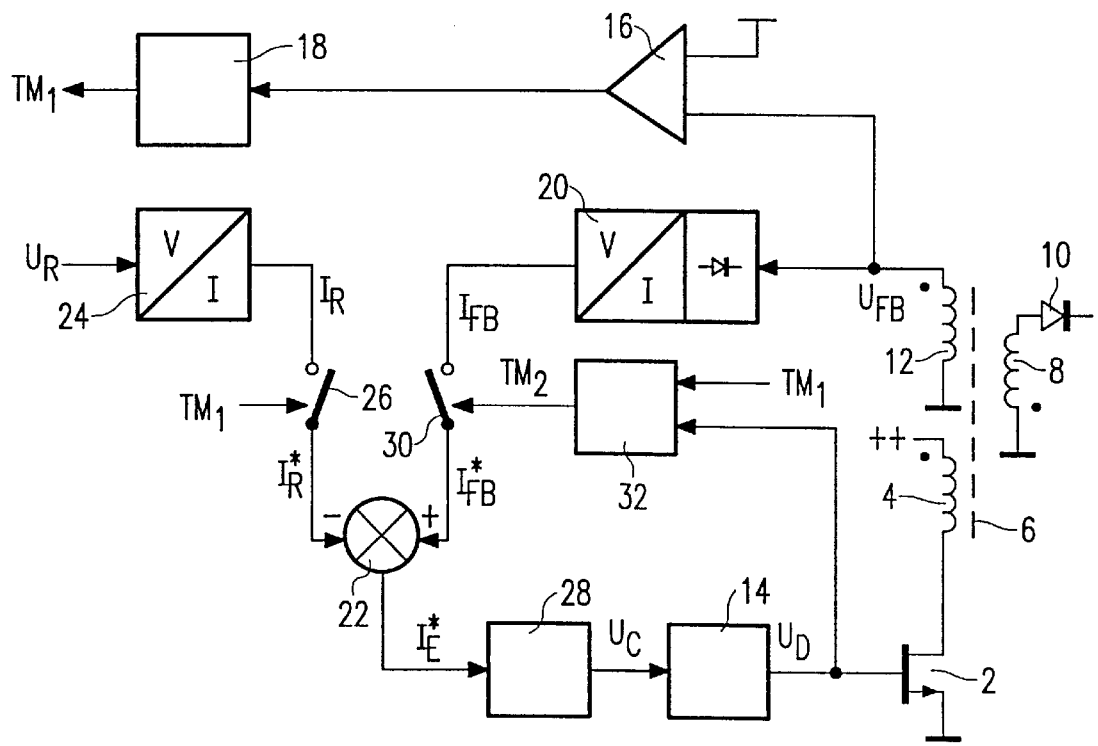
FIG. 3 shows a switched-made power supply in accordance with the invention.
Figure 4:
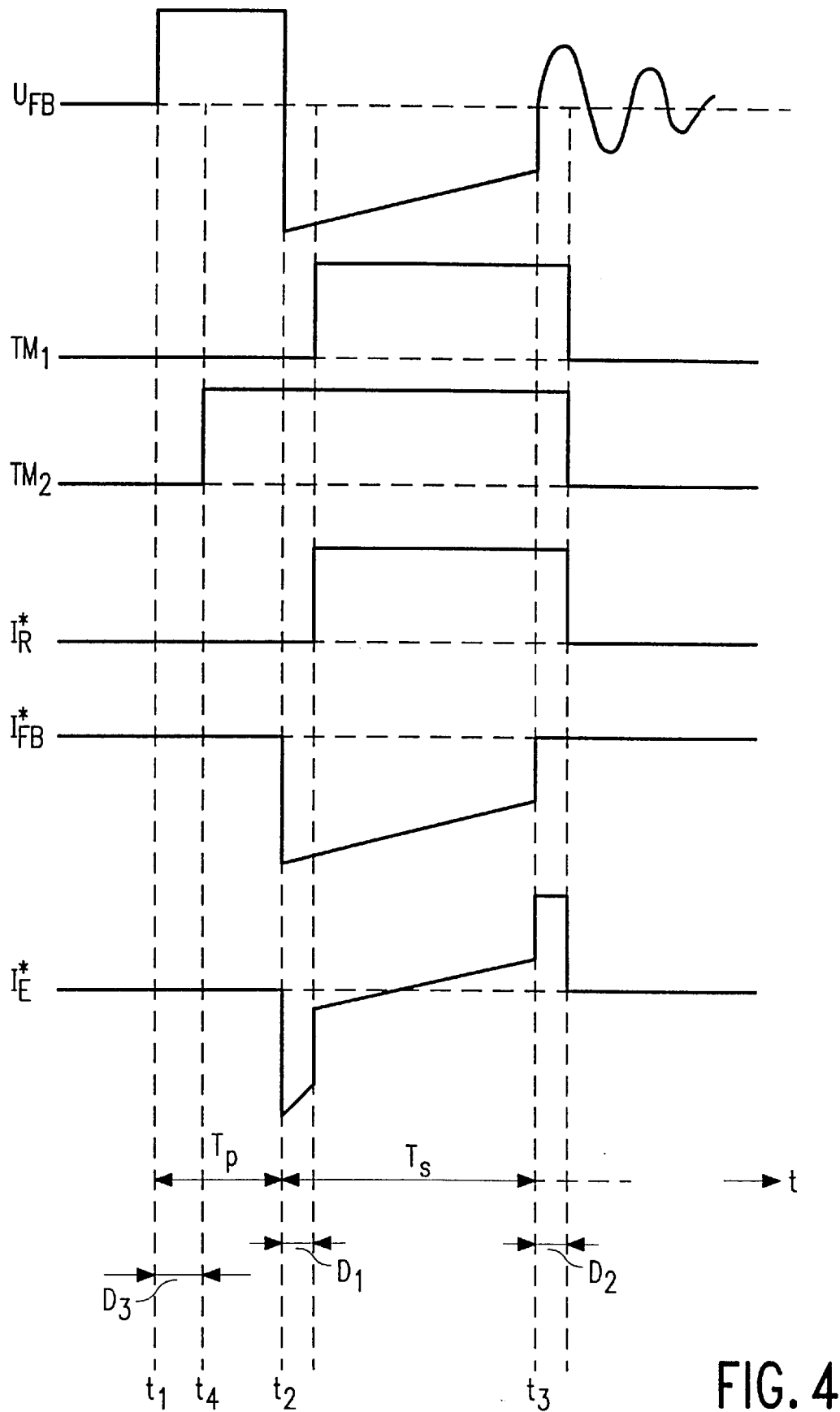
FIG. 4 shows signal waveforms appearing in the switched-made power supply of FIG. 3.

FIG. 3 shows a switched-mode power supply in accordance with the invention which combats the dependence upon the delay. FIG. 4 shows the associated signal waveforms. Just as in FIG. 1 the reference current $I_R$ is transferred by means of the time-selective element 26 under command of the delayed first timing signal TM1, which results in the sampled reference current $I^*_R$ as shown in FIG. 4. The feedback current $I_{FB}$, however, is transferred by means of the second time-selective element 30 under command of a second timing signal $TM_2$, whose leading edge occurs at an instant $t_4$ in the primary interval $T_P$ and whose trailing edge substantially coincides with the trailing edge of the first timing signal $TM_1$. However, alternatively, the trailing edge of the second timing signal $TM_2$ may coincide with the end of the secondary interval $T_S$, i.e. at the instant $t_3$, or it may coincide with any instant after the instant $t_3$ but within the first positive half-cycle of the voltage $U_{FB}$. As is apparent from FIG. 4, the sampled feedback current $I^*_{FB}$ now also comprises the negative signal portion which occurs during the delay time $D_1$ after the instant $t_2$. This negative signal portion compensates for the positive signal portion in the sampled error current $I^*_E$ which occurs in the delay time $D_2$ after the instant $t_3$. The error contribution in the sampled reference current $I^*_R$ is caused by the difference between the delays $D_1$ and $D_2$. The error contribution in the sampled feedback current $I^*_{FB}$ is caused by the absolute value of the delay $D_1$. The construction with two separate time-selective elements and the additional second timing signal eliminates the error contribution in the sampled feedback current.

The second timing signal $TM_2$ is formed in a logic unit 32, which receives the first timing signal $TM_1$ to define the trailing edge of the second timing signal $TM_2$. To define the leading edge of the second timing signal $TM_2$ the logic unit 32 receives he control signal $U_d$ from the driver 14. The leading edge of this signal at the instant $t_1$ is used to generate the leading edge of the second timing signal $TM_2$ at the instant $t_4$. A possible delay $D_3$ between the instants $t_1$ and $t_4$ does not play any part as long as the instant $t_4$ remains within the primary interval $T_P$.

Figure 5:
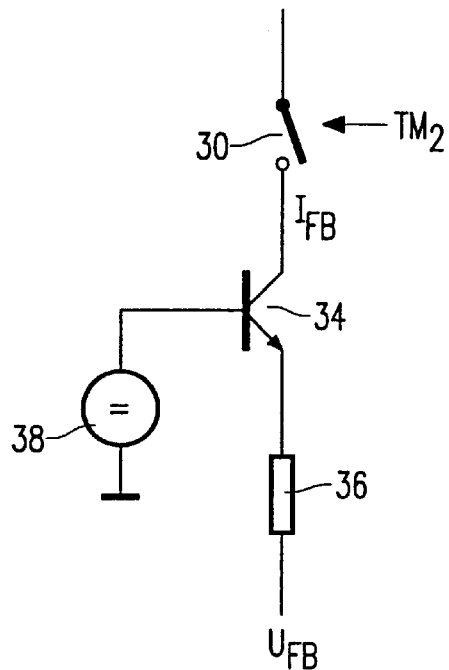
FIG. 5 shows a first voltage-current converter for use in the switched-mode power supply of FIG. 3.

It is true that the delay of the unidirectional voltage-current converter 20 also plays a role, but this can be kept comparatively insignificant by comparatively Simple means. FIG. 5 shows in NPN transistor 34 which has its emitter connected to the feedback voltage $U_{FB}$ via a conversion resistor 36. The transistor 34 has its base connected to a suitably selected direct voltage source 38 and has its collector connected to the second time-selective element 30. The transistor 34 conducts only for negative-going signals and is consequently unidirectional. The voltage-current conversion is very rapid and is only limited by the transition frequency $F_T$ of the transistor 34. Instead of a bipolar transistor it is likewise possible to use a unipolar (MOS) transistor.

Figure 6:
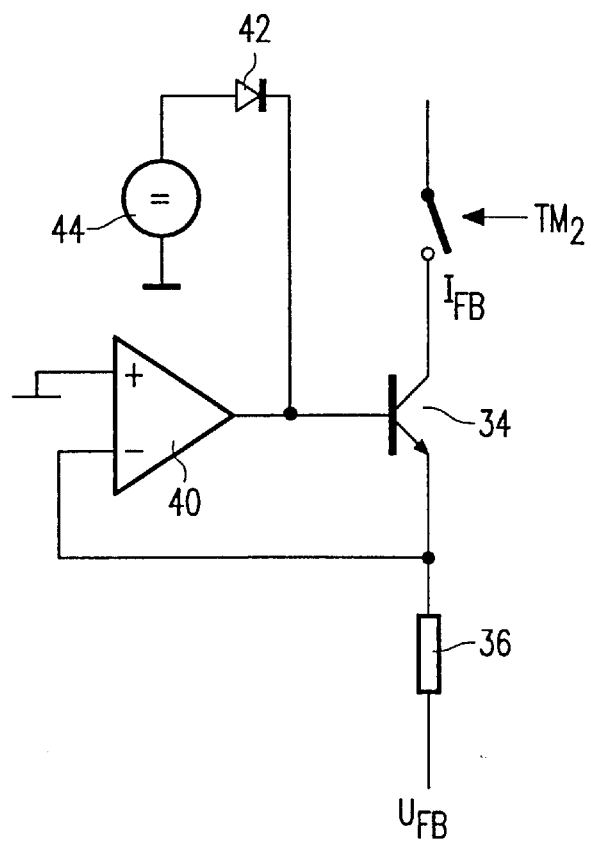
FIG. 6 shows a second voltage-current converter for use in the switched-mode power supply of FIG. 3.

FIG. 6 shows an alternative arrangement, in which the emitter of the transistor 34 is held at ground potential by an operational amplifier 40 having its non-inverting input connected to ground, its inverting input to the emitter of the transistor 34, and its output to the base of the transistor 34. A clamp comprising a diode 42 and a voltage source 44 provides the base bias of the transistor 34.

What is claimed is:

1. A switched-made power supply comprising: an inductive element (4) and a switching element (2), arranged in series to receive a supply voltage; control means (14) for closing the switching element (2) during a primary interval ($T_P$) and opening the switching element (2) during a secondary interval ($T_S$) in response to a control signal ($U_C$); measurement means (20) for unidirectionally measuring a feedback signal ($U_{FB}$) which is representative of a signal voltage produced across the inductive element (4) as a result of the switching element (2) being opened and closed; means (16, 18) for deriving from the feedback signal ($U_{FB}$) a first timing signal ($TM_1$) which is representative of the secondary interval ($T_S$); time-selective comparison means (22, 26) for comparing the unidirectionally measured feedback signal ($I_{FB}$) with a reference signal ($I_R$) during at least the secondary interval ($T_S$); and integration means (28) for generating the control signal ($U_C$) in response to the comparison, character in that the switched-mode power supply further comprises means (32) for generating a second timing signal ($TM_2$) having a starting instant ($t_4$) which falls within the primary interval ($T_P$) and having an end instant which at least does not precede the end instant of the secondary interval ($T_S$); and the time-selective comparison means comprise: a first time-selective element (26) for transferring the reference signal ($I_R$) in response to the first timing signal ($TM_1$), and a second time-selective element (30) for transferring the unidirectionally measured feedback signal ($I_{FB}$) in response to the second timing signal ($TM_2$).

2. A switched-mode power supply as claimed in claim 1, in which the means (32) for generating the second timing signal ($TM_2$) comprises a logic unit (32) having inputs for receiving the first timing signal ($TM_1$) and a control signal ($U_D$) for the switching element (2).

3. A switched-mode power supply as claimed in claim 1 in which the measurement means (20) for unidirectionally measuring the feedback signal takes the form of a unidirectional voltage-current converter.

4. A switched-mode power supply as claimed in claim 3, in which the unidirectional voltage-current converter comprises a transistor (34) having an emitter connected to receive the feedback signal ($U_{FB}$) via resistor (36), having a collector connected to the second time-selective element (30), and having a bas connected to a bias voltage source (38).

5. A switched-made power supply as claimed in claim 4, in which the transistor (34) has its base coupled to the bias voltage source (44) via a diode (42) and the transistor (34) has its emitter connected to an inverting input of a differential amplifier (40), which differential amplifier (40) has a non-inverting input connected to signal ground and has an output connected to the base of the transistor (34).

6. A switched-mode power supply as claimed in claim 1, in which the inductive element (4) is a primary winding of a transformer (6) having an auxiliary winding (12) for generating the feedback signal ($U_{FB}$).

7. A switched-mode power supply as claimed in claim 6, in which the means for generating the first timing signal ($TM_1$) comprise a comparator (16) having inputs connected to the auxiliary winding (12) to receive the feedback signal ($U_{FB}$).

* * * * *